US012774681B1

(12) United States Patent
Chere et al.

(10) Patent No.: US 12,774,681 B1
(45) Date of Patent: Oct. 27, 2026

(54) BOWED ROTOR START MITIGATION USING LIQUID WATER AS RISK KNOCKDOWN

(71) Applicant: RTX CORPORATION, Farmington, CT (US)

(72) Inventors: Gregory M. Chere, Glastonbury, CT (US); Carroll V. Sidwell, Wethersfield, CT (US); Neil J. Terwilliger, Cheshire, CT (US); Andre M. Ajami, Henderson, NV (US); Rishon Saftler, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/280,593

(22) Filed: Jul. 25, 2025

(51) Int. Cl.
*F02C 7/143* (2006.01)
*F01D 25/34* (2006.01)

(52) U.S. Cl.
CPC ............ *F02C 7/1435* (2013.01); *F01D 25/34* (2013.01); *F05D 2220/323* (2013.01); *F05D 2240/128* (2013.01); *F05D 2260/212* (2013.01); *F05D 2270/303* (2013.01)

(58) Field of Classification Search
CPC ........ F02C 7/1435; F01D 25/34; F01D 25/36; F01D 21/003; F01D 21/14; F01D 21/20; F01D 25/32; F01D 25/007; F01D 25/002
See application file for complete search history.

(56) References Cited

U.S. PATENT DOCUMENTS

| | | | |
|---|---|---|---|
| 8,820,046 B2 | 9/2014 | Ross et al. | |
| 10,337,405 B2 | 7/2019 | Steen et al. | |
| 12,134,984 B1 | 11/2024 | Evans et al. | |
| 2006/0075755 A1* | 4/2006 | Haertel | F04D 29/5846 60/39.53 |
| 2017/0234238 A1* | 8/2017 | Schwarz | F01D 21/00 60/778 |
| 2018/0010480 A1* | 1/2018 | Hockaday | F01D 11/08 |
| 2018/0334963 A1 | 11/2018 | Fernholz et al. | |
| 2021/0301677 A1* | 9/2021 | Tomescu | F01D 19/02 |
| 2023/0141059 A1* | 5/2023 | Minas | F01D 19/02 60/646 |
| 2023/0323835 A1* | 10/2023 | Kumar | F02C 7/12 415/177 |
| 2023/0374941 A1* | 11/2023 | Terwilliger | F02C 3/305 |

* cited by examiner

*Primary Examiner* — Andrew H Nguyen
(74) *Attorney, Agent, or Firm* — Carlson, Gaskey & Olds, P.C.

(57) ABSTRACT

An aircraft propulsion system includes a water injection system that includes a plurality of nozzles configured to inject water onto at least one of a plurality of compressor stages and turbine stages, and a controller that is configured to operate the water injection system and a drive system to rotate the compressor and turbine section while injecting water through the plurality of nozzles for cooling a portion of one of the compressor section, the turbine section and a case structure.

15 Claims, 6 Drawing Sheets

BOWED ROTOR START MITIGATION USING LIQUID WATER AS RISK KNOCKDOWN

TECHNICAL FIELD

The present disclosure relates to an active mitigation process for addressing imbalances caused by bowing of rotating and static structures due to temperature imbalances.

BACKGROUND

Upon engine shutdown, natural convection within the core and disks and buoyancy of warmer air causes a temperature gradient that results in metal expanding where there is more heat within the engine (typically at the top), relative to where there is less heat (typically at the bottom). A bowed rotor and bowed backbone can result in additional imbalance and deflections upon startup as the rotor speed approaches rotor dynamic critical speeds or modes. The imbalances caused by the temperature gradients may be addressed by allowing sufficient time for the heat to dissipate such that the gradient disappears. The imbalances may also be addressed using an active mitigation process when sufficient time for heat dissipation is not practical. Active mitigation may include a motoring process where the engine rotor is rotated in a slow and unpowered condition upon shutdown or start-up to remove heat from the engine quickly. Active mitigations can complicate operation and be burdensome if longer periods of time are required to adequately mitigate the bow. Improving active mitigation processes can provide faster aircraft turnaround times and can improve engine operation.

SUMMARY

An aircraft propulsion system according to an exemplary embodiment of this disclosure, among other possible things includes a core engine section that includes a compressor section comprising a plurality of compressor stages, a turbine section that includes a plurality of turbine stages, a shaft that couples the compressor section to the turbine section about an engine longitudinal axis, and a case structure that circumscribes the compressor section and the turbine section and supports rotation of the shaft, a water injection system that includes a tank and a plurality of nozzles that are disposed within the case structure within at least one of the compressor section and the turbine section, each of the plurality of nozzles is configured to inject water onto at least one stage of the plurality of compressor stages and the plurality of turbine stages, a drive system that is coupled to the shaft and configured to rotate the compressor section and the turbine section at a first rotational speed, and a controller that is configured to operate the water injection system and the drive system to rotate the compressor section and the turbine section while injecting water through the plurality of nozzles for cooling a portion of one of the compressor section, the turbine section and the case structure.

In a further embodiment of the foregoing aircraft propulsion systems, the plurality of nozzles are arranged in an upper portion case structure above the engine longitudinal axis.

In a further embodiment of any of the foregoing aircraft propulsion systems, each of the plurality of compressor stages includes a compressor stator that is fixed to the case structure and a compressor rotor. The plurality of nozzles are configured to inject water against at least the compressor stator of at least one compressor stage of the plurality of compressor stages, and the case structure.

In a further embodiment of any of the foregoing aircraft propulsion systems, each of the plurality of turbine stages includes a turbine stator that is fixed to the case structure and a turbine rotor. At least one of the plurality of nozzles are configured to inject water against at least the turbine stator of at least one turbine stage of the plurality of turbine stages, and the case structure.

In a further embodiment of any of the foregoing, the aircraft propulsion system further includes a water recovery system for recovering water from an exhaust gas stream during engine operation, recovered water is communicated to the tank.

In a further embodiment of any of the foregoing aircraft propulsion systems, the water recovery system includes a condenser where a cooling flow is in thermal communication with the exhaust gas flow and a separator for separating water from the exhaust gas flow.

In a further embodiment of any of the foregoing aircraft propulsion systems, the controller is further configured to receive temperature information indicative of a temperature within at least one of the compressor section and the turbine section and controlling the drive system and the water injection system for a duration of time in response to the temperature information.

In a further embodiment of any of the foregoing aircraft propulsion systems, the controller is further configured to operate the water injection system to inject water only through selected ones of the plurality of nozzles located above the longitudinal engine axis.

In a further embodiment of any of the foregoing aircraft propulsion systems, the controller is further configured to shut down the water injection system in response to at least one of an expiration of a time, a sensed temperature being within a defined range, and an indication of water build up in a portion of the case structure.

In a further embodiment of any of the foregoing aircraft propulsion systems, the controller is further configured to continue rotation of the compressor section and the turbine section at the motoring speed for a predefined time after injection of water is discontinued.

In a further embodiment of any of the foregoing aircraft propulsion systems, the controller is further configured to shut off water injection prior to an engine start operation.

In a further embodiment of any of the foregoing aircraft propulsion systems, the controller is further configured to initiate the drive system and the water injection system after an engine shut down operation.

A method of mitigating rotor bow of a gas turbine engine according to another exemplary embodiment of this disclosure, among other possible things includes rotating a rotor within a fixed case structure at a first rotational speed with a drive system operable independent of power generation by the gas turbine engine, injecting water against at least one of the rotors and the fixed case structure, and discontinue the injection of water in response to at least one of an expiration of time and an indication that the at least one of the rotor and the fixed case structure are within a predefined temperature range.

In a further embodiment of the foregoing method, the injection of water further includes injecting water within a region of the rotor and the case structure above an engine longitudinal axis.

In a further embodiment of any of the foregoing, the method further includes recovering water from an exhaust gas flow during engine operation that includes combustion of a mixture of fuel and inlet air and storing the recovered water within a tank. Injecting water includes drawing at least a portion of recovered water and injecting the water through at least one of a plurality of nozzles.

In a further embodiment of any of the foregoing methods, rotating the rotor further includes coupling an electric motor to a shaft that supports the rotor and driving rotation of the rotor with the electric motor.

In a further embodiment of any of the foregoing, the method further includes discontinuing water injection prior to an engine start operation.

In a further embodiment of any of the foregoing, the method further includes initiating rotation of the rotor and injection of water after an engine shut down operation.

In a further embodiment of any of the foregoing, the method further includes detecting a presence of water accumulation within the case structure and discontinuing the injection of water in response to the detected water accumulation exceeding a predefined amount.

In a further embodiment of any of the foregoing, the method further includes measuring a parameter of at least one of the rotors and the case structure indicative of a bowed condition and initiating the injection of water in response to the measured parameter indicating the presence of the bowed condition.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
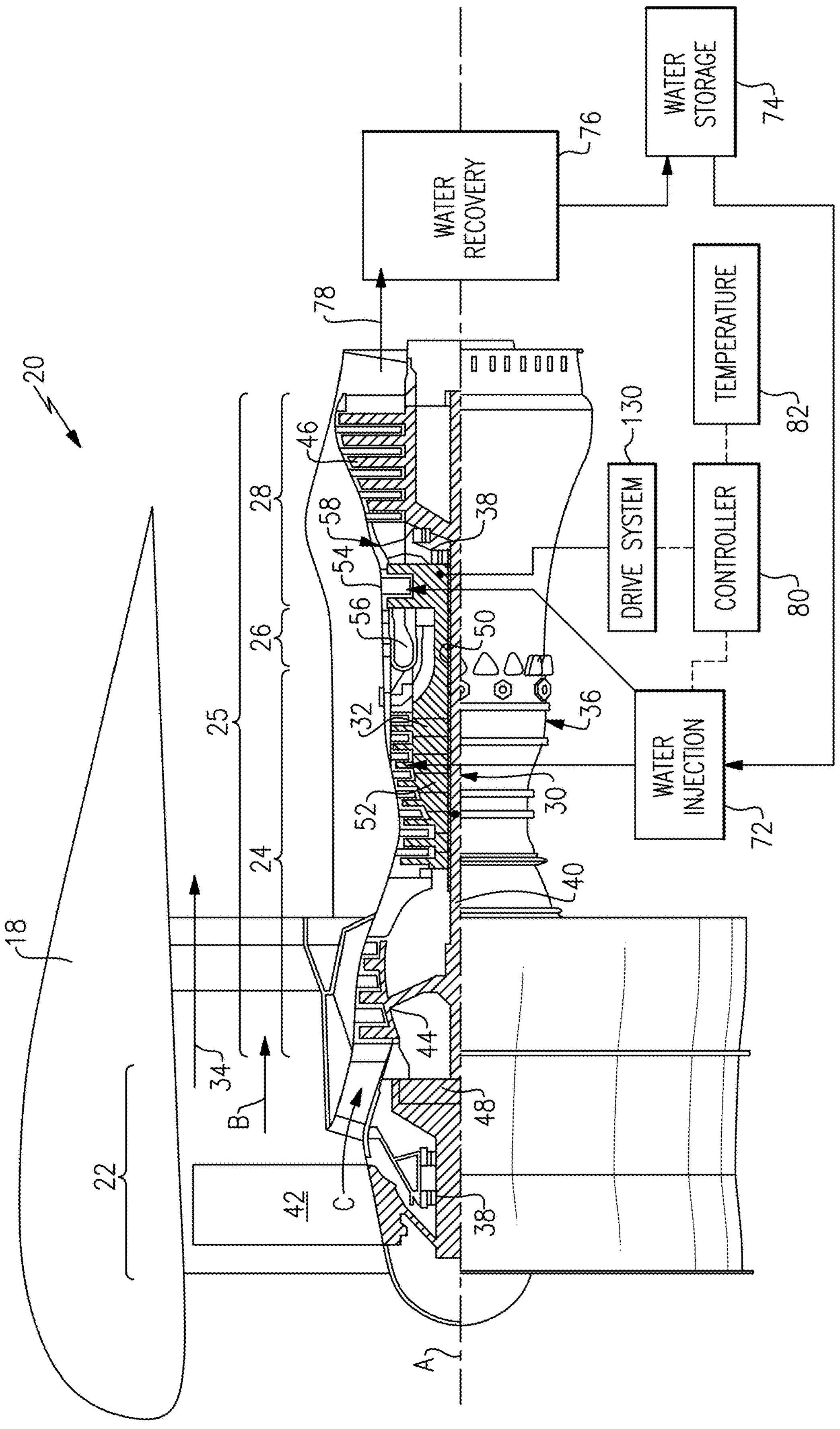
FIG. 1 is a schematic view of an example gas turbine engine and water injection system for rotor bow mitigation.

FIG. 1 schematically illustrates an aircraft propulsion system 20 including a water injection system 72 configured to inject water into locations within a core engine section 25 to mitigate bowing of rotor and engine case components caused by uneven cooling after engine shutdown. Rising warmer air causes upper portions of rotor, shaft, and case components to cool slower than lower components, causing uneven contractions. The disclosed example water injection system 72 utilizes water from an onboard storage tank 74 to cool upper portions of rotor and case components to mitigate temperature differences. Water may be loaded and stored or recovered from the exhaust gas flow 78 in a water recovery system 76. A controller 80 is configured to operate the water injection system 80 based on predefined operating schedules, temperature information 82, or a combination of information.

The controller 80 operates the water injection system 72 as part of an active mitigation process that includes rotating portions of the core engine 25 while water is injected to enhance cooling of engine components to mitigate non-uniform cooling. The core engine 25 is rotated using an external drive system 130. The example drive system 130 may be an electric motor coupled to a shaft of the core engine 25. The example drive system 130 may also include other systems that enable rotation of core engine components without combusting fuel within a combustor 56.

Although depicted as a ducted two-spool turbofan gas turbine engine in the disclosed non-limiting embodiment, the concepts described herein are not limited to use with ducted architectures or two-spool turbofans as the teachings may be applied to other types of turbine engines including three-spool architectures, as well as other gas turbine engines including but not limited to prop fan, turbo shaft or other unducted or ducted gas turbine engine architectures.

The exemplary core engine 25 includes a low speed spool 30 and a high speed spool 32 mounted for rotation about an engine central longitudinal axis A relative to an engine static structure 36. Various bearing systems 38 at various locations may alternatively or additionally be provided, and the location of bearing systems 38 may be varied as appropriate to the application.

The low speed spool 30 includes an inner shaft 40 that interconnects, a first (or low) pressure compressor 44 and a first (or low) pressure turbine 46. The inner shaft 40 is connected to the fan section 22 through a speed change mechanism, which in the exemplary core engine 25 is illustrated as a geared architecture 48 to drive fan blades 42 of the fan section 22 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan section 22 and low pressure compressor 44 through the geared architecture 48 such that the fan section 22 and low pressure compressor 44 are rotatable at a common speed. Although this application discloses geared architecture 48, its teaching may benefit direct drive engines having no geared architecture.

The high speed spool 32 includes an outer shaft 50 that interconnects a second (or high) pressure compressor (HPC) 52 and a second (or high) pressure turbine (HPT) 54. A combustor 56 is arranged in the exemplary core engine 25 between the high pressure compressor 52 and the high pressure turbine 54. A mid-turbine frame 58 of the engine static structure 36 may be arranged between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core engine 25 may be a high bypass geared aircraft engine. The teachings disclosed herein may be utilized with various engine architectures, such as low-bypass turbofan engines, prop fan and/or open rotor engines, turboprops, turbojets, etc.

The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan section 22.

Figure 2:
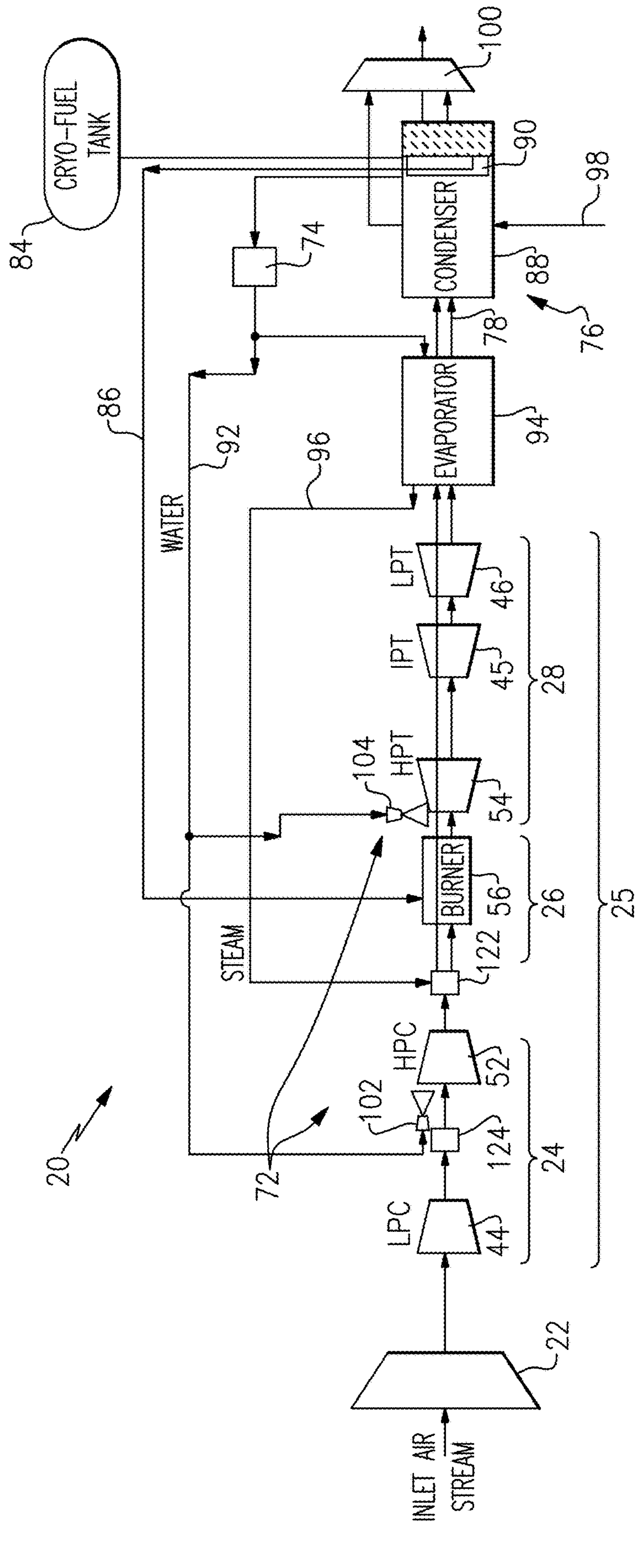
FIG. 2 is a schematic view of an example gas turbine engine including a water injection system for rotor bowing mitigation and a water recovery system.

Referring to FIG. 2 with continued reference to FIG. 1, the aircraft propulsion system 20 may utilize a cryogenic fuel for generation of the exhaust gas flow 78. The cryogenic fuel is stored in a fuel tank 84 configured to maintain temperatures of the fuel in a liquid form. In one example embodiment, the cryogenic fuel is a hydrogen-based fuel. The hydrogen-based fuel may be hydrogen and/or be derived from hydrogen containing compounds such as ammonia. In another example embodiment, the cryogenic fuel is a liquid natural gas. It should be appreciated that although hydrogen, ammonia and liquid natural gas are disclosed by way of example, other cryogenic fuels could be utilized and are within the scope and contemplation of this disclosure.

The example water recovery system 76 includes a condenser 88 where the exhaust gas flow 78 is cooled by a cooling flow 98 to condense liquid water. A water separator 90 extracts condensed liquid from the exhaust gas flow 78 and directs the water to the on-board storage tank 74. The cooling flow 98 may be a ram air flow, the bypass flow 34 or a cryogenic fuel flow 86. In either configuration, water is directed to the water tank 74 and the remaining exhaust gas flow is exhausted through an exhaust nozzle 100. A water flow 92 is supplied from the storage tank 74 to the nozzles 102, 104 of the water injection system 72. A portion of the water flow 92 may be used for intercooling and be injected within the compressor section 24 at a location 124. The example location 124 is shown between compressor sections 44 and 52 but may be injected at more or alternate locations within the compressor section 24 and remain with the scope of this disclosure.

An evaporator 94 may be included to generate a steam flow 96 from some portion of the recovered water. In the evaporator 94, thermal energy from the exhaust gas flow 78 is utilized to vaporize a portion of the recovered water to generate the steam flow 96. The steam flow 96 may be injected at a location 122 prior to the combustor 56, into the core flow path C to enhance mass flow through the turbine section 28. The example location 122 is shown after the compressor section 52 and before the combustor 56 but may be injected at more or alternate locations within the compressor section 24 and remain with the scope of this disclosure.

Figure 3:
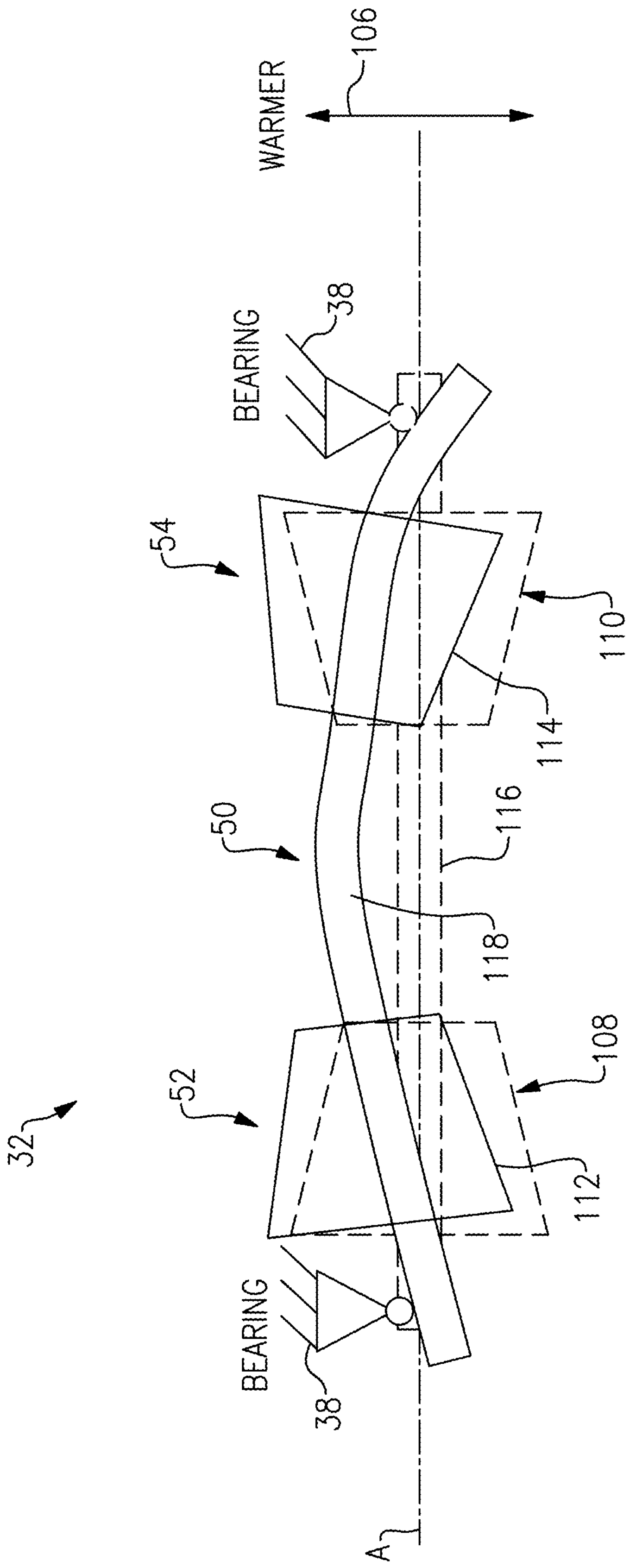
FIG. 3 is a schematic view illustrating rotor and case bowing.

Referring to FIG. 3, during engine operation, components of the core engine operate at temperatures that are uniform due to uniform distribution of heat and flows. Upon engine shutdown, warmer air rises and creates a temperature gradient 106 with upper portions of the engine being hotter than lower portions of the engine. The uneven distribution of temperatures results in an uneven contraction of engine structures. In one illustrated example, the high spool 32 includes the HPC 52 and the HPT 54 coupled by the inner shaft 50. A normal, non-bowed state of the HPC 52, HPT 54 and the shaft 50 are represented by the dashed lines 108, 110 and 116, respectively. An exaggerated representation of a bowed condition of each of the HPC 52, HPT 54 and the shaft 50 is shown by solid lines 112, 114 and 118, respectively. The exaggerated illustration shows how the uneven cooling can cause mis alignment and undesired engagement.

Figures 4, 5:
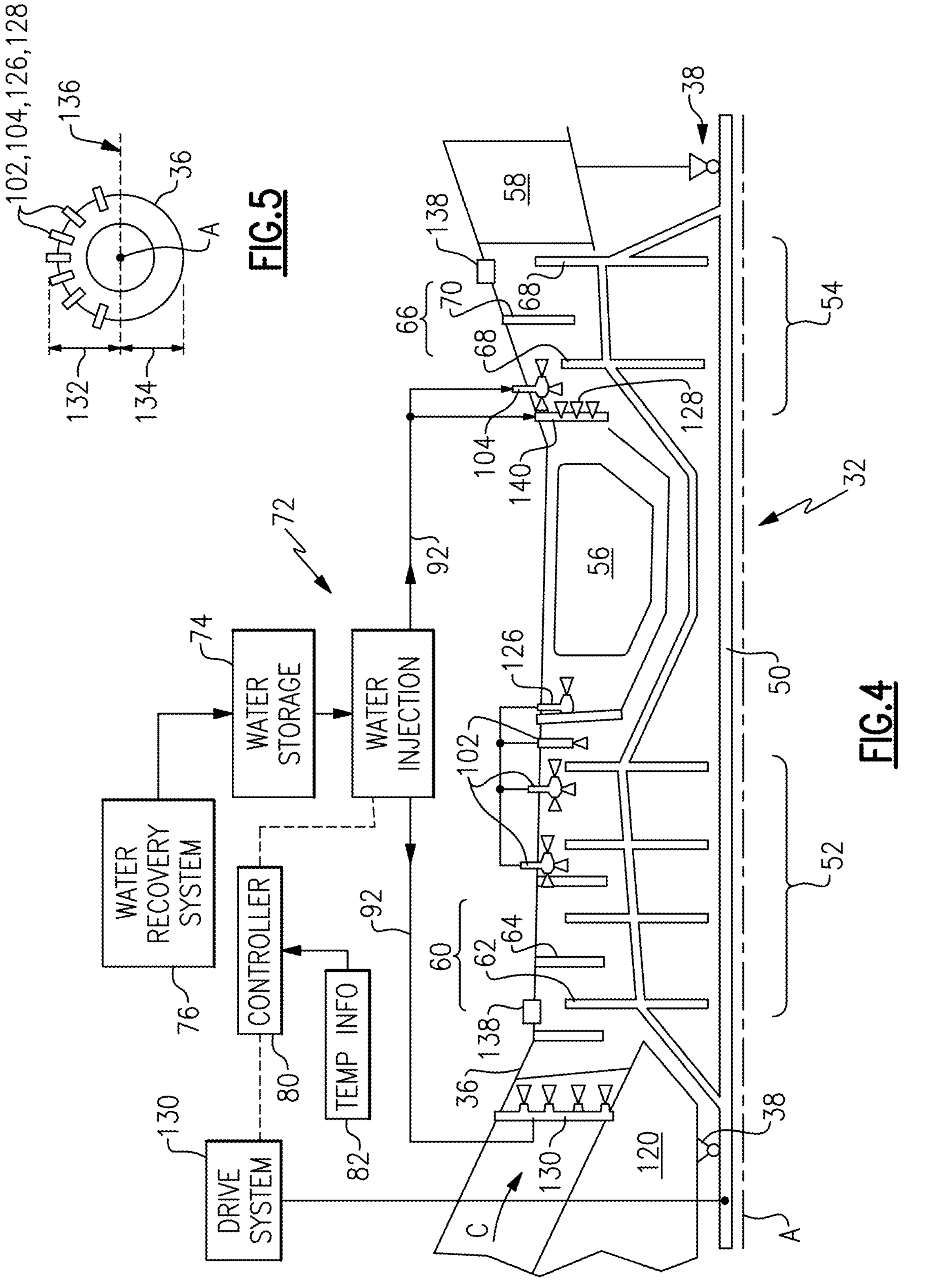
FIG. 4 is a schematic view of a portion of an example gas turbine engine and water injection system for rotor bow mitigation.
FIG. 5 is a schematic axial view of nozzle locations, for an example water injection system embodiment.

Referring to FIG. 4, the high spool 32 is shown schematically relative to the engine static structure 36. The engine static structure 36 represents the case, or cases that support bearings 38 and within which the high spool 32 rotates. The example engine static structure 36 is disposed between an intermediate case 120 and the mid-turbine frame 58. The static structure 36 is shown by way of example and other structures could be utilized and are within the contemplation of this disclosure.

The example HPC 52 includes a plurality of compressor stages 60. Although a number of compressor stages 60 are shown by way of example, the disclosed system is applicable to compressor sections with any number of stages. Each of the plurality of compressor stages 60 includes a compressor stator 62 and a compressor rotor 64. The compressor stators 62 are supported on the engine static structure 36 as schematically shown. It should be appreciated that the engine static structure 36 and the compressor stators 64 are shown schematically and may include several static components secured together. The compressor rotors 62 are coupled to the inner shaft 50 for rotation about the engine longitudinal axis A. A plurality of water nozzles 102 are supported by the engine static structure 36 and are directed to spray water on at least one of the stators 64 and rotors 62. A nozzle 126 is supported at the inlet to the combustor to provide further coverage for water injection.

The HPT 54 includes at least one turbine stage 66. The example turbine stage 66 includes a turbine stator 70 and a turbine rotor 68. A guide vane 140 is disposed at the outlet of the combustor 56 and directs the exhaust gas flow into the HPT 54. The guide vane 140 may support additional water nozzles 128. A plurality of water nozzles 104 are supported by the engine static structure 36 within the HPT 54. The nozzles 104 are arranged to spray water onto the turbine rotors 68 and stators 70.

The nozzles 102, 104, and 128 may be a structure that extends from a corresponding stator and may be multi-directional. The nozzles 102 and 104 are multi-directional and direct water forward and aft. The nozzles 102, 104 may direct water towards an inner surface of the engine structure 36 radially or tangentially. Additionally, the nozzles 102 and 104 may direct some water flow inward toward rotors 62, 68. Each nozzle may be of a common configuration or may differ based on the specific location. The nozzles 102, 104, 126 and 128 may also be built into a corresponding one of the stators.

The controller 80 operates a drive system 130 and water injection system 72 during active bow mitigation processes. Operation may be based on a predefined schedule or on temperature information 82 obtained from temperature sensors 138 located throughout the core engine 25. The drive system 130 is coupled to a shaft 50. The drive system 130 may be an electric motor, hydraulic drive, or any other drive system operable before start up and/or after shutdown of power generation from the core engine 25. Accordingly, the drive system 130 is operable independent of power generation by the core engine 25.

Referring to FIG. 5, with continued reference to FIG. 4, the nozzles 102, 104, 126 and 128, in one example embodiment, are arranged in an upper portion of the case structure 36. The case structure 36 includes an upper portion 132 disposed above a horizontal plane 136 extending through and parallel to the engine longitudinal axis A. A lower portion 134 is disposed below the plane 136.

Because the upper portion 132 of the case structure is heated more than the lower portion 134, cooling water spray from the nozzles 102, 104, 126 and 128 is concentrated above the horizontal plane 136. The increased cooling at the upper portion of the engine provides a more uniform temperature distribution, which reduces the bowing condition quickly to enable engine start up within a reduced period.

The example nozzles 102, 104, 126, and 128 may be structures for dedicated use for active mitigation operation. The example nozzles 102, 104, 126, and 128 may also be part of other systems, such as for example, an intercooling system. Accordingly, the example water injection system 72 may be used for both intercooling and active mitigation processes. All or a subset of the nozzles, 102, 104, 126, and 128 may be used for both intercooling and an active mitigation of bowing.

Active mitigation procedure may be performed at either engine shutdown or engine start up. Both active mitigation procedures include rotating the high spool 32 at a low speed with the drive system 130. While the high spool 32 is rotated, water is injected against surfaces of the static engine structure 36 including the stators 64, 70 and the rotors 62, 68. Injected water will cool the surfaces contacted faster than those not contacted. Water will run toward the bottom of the engine to further cool components and reduce any thermal gradients that are present.

Figure 6:
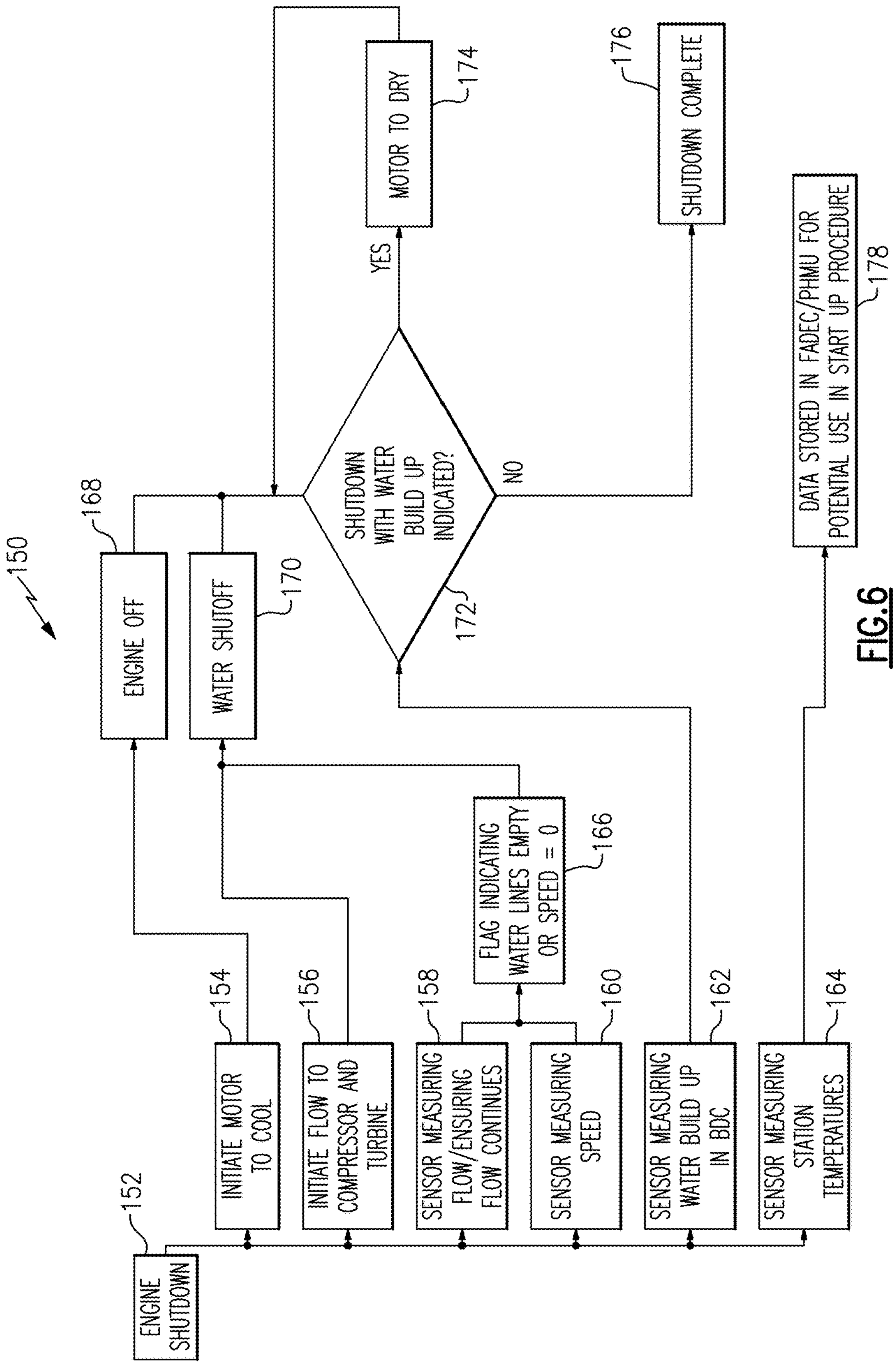
FIG. 6 is a flow diagram of process steps, for an example active mitigation shutdown process.

Referring to FIG. 6 with continued reference to FIG. 4, in one example operational embodiment, an example active mitigation shutdown process is schematically shown and indicated at 150. Upon an indication that the engine has been shutdown as indicated at 152, a series of actions and confirmation are performed to initiate mitigation. The controller 80 is configured to actuate the components and systems required to for active mitigation at shutdown.

The example controller 80 is a device and system for performing necessary computing or calculation operations of the water injection system 72 and the drive system 130 to perform the active mitigation steps at shutdown. The controller 80 may be specially constructed for operation of the water injection system 72 and drive system 130 for active mitigation, or it may comprise at least a general-purpose computer selectively activated or reconfigured by software instructions stored in a memory device. The controller 80 may further be part of full authority digital engine control (FADEC) or an electronic engine controller (EEC).

The initial steps of the example operations of the example active mitigation shutdown process 150 includes initiating operation of the drive system as indicated at 154 and water flow to the HPC 52 and HPT 54 as indicated at 156. At this stage in process 150, the drive system 130 rotates the high spool 32 at a predefined speed and the water injection system 72 has begun spraying water through at least the nozzles 102 and 104. The other nozzles 126 and 128 may additionally receive and spray water on respective components. The amount of water that is provided through the nozzles 102, 104 may be predefined or may be varied depending on temperature measurements at specific locations as indicated at 164. The process is monitored during the active mitigation process 150 to assure that water is not accumulated while the high spool 32 is stopped. Water flow through the nozzles 102, 104 is monitored and confirmed as indicated at 158. The flow of water is continually monitored as indicated at 166. Additionally, the rotational speed of the high spool 32 is monitored as indicated at 160. Monitoring continues throughout the mitigation process.

The presence and accumulation of water at the bottom of the engine may be monitored as indicated at 162. Excessive water accumulation at the bottom of the engine (e.g., bottom dead center or BDC as illustrated at 162) may not be desirable, such accumulation may result in increased cooling of bottom portions of the engine. As appreciated, the mitigation process is to increase cooling in upper components relative to lower components to counter increased heating. Increased cooling at lower portions may slow the mitigation process. Accordingly, the accumulation of water is monitored so that the process can be adjusted to maintain a desired balance of cooling between upper and lower engine portions. Any sensor system that provides an indication of water accumulation could be utilized and is within the contemplation of this disclosure.

The active mitigation process 150 may be operated for a predefined period or based on real-time information. In one example embodiment, temperature information 164 may be utilized as a prompt to initiate, control, and end the active mitigation process 150. Temperature information 164 may be provided by existing temperature sensors 138 disposed at various locations in the core engine 25. The temperature information may also be obtained from dedicated sensors for use during the active mitigation process 150.

Upon expiration of the predefined period or reaching a predefined temperature, the active mitigation process 150 may be discontinued. The process ends by stopping rotation as indicated at 168 and shutting off water flow 170. The two actions may be done concurrently, or in a sequence. For example, the water may be shut down first followed shortly thereafter by stopping engine rotation.

The active mitigation shutdown process 150 provides for the evacuation of any water accumulated at the bottom of the engine. A query as to the presence of excessive water is made prior to completely shutting down the mitigation process as indicated at 172. If excessive water is present at the bottom of the engine, the drive system 130 may continue rotation of the high spool 32 until the bottom of the engine is dry as indicated at 174. In this condition, the high spool 32 is rotated without water injection until water is circulated and spread through the engine to eliminate any accumulation. Once the excessive accumulation is eliminated, the mitigation process is completed as indicated at 176.

Information obtained by various engine sensors including temperature information, speed, and any other information indicative of the performance of the mitigation process is stored as indicated at 178 for later use. The stored information can be used at engine start up, for maintenance purposes and to improve future mitigation procedures.

Figure 7:
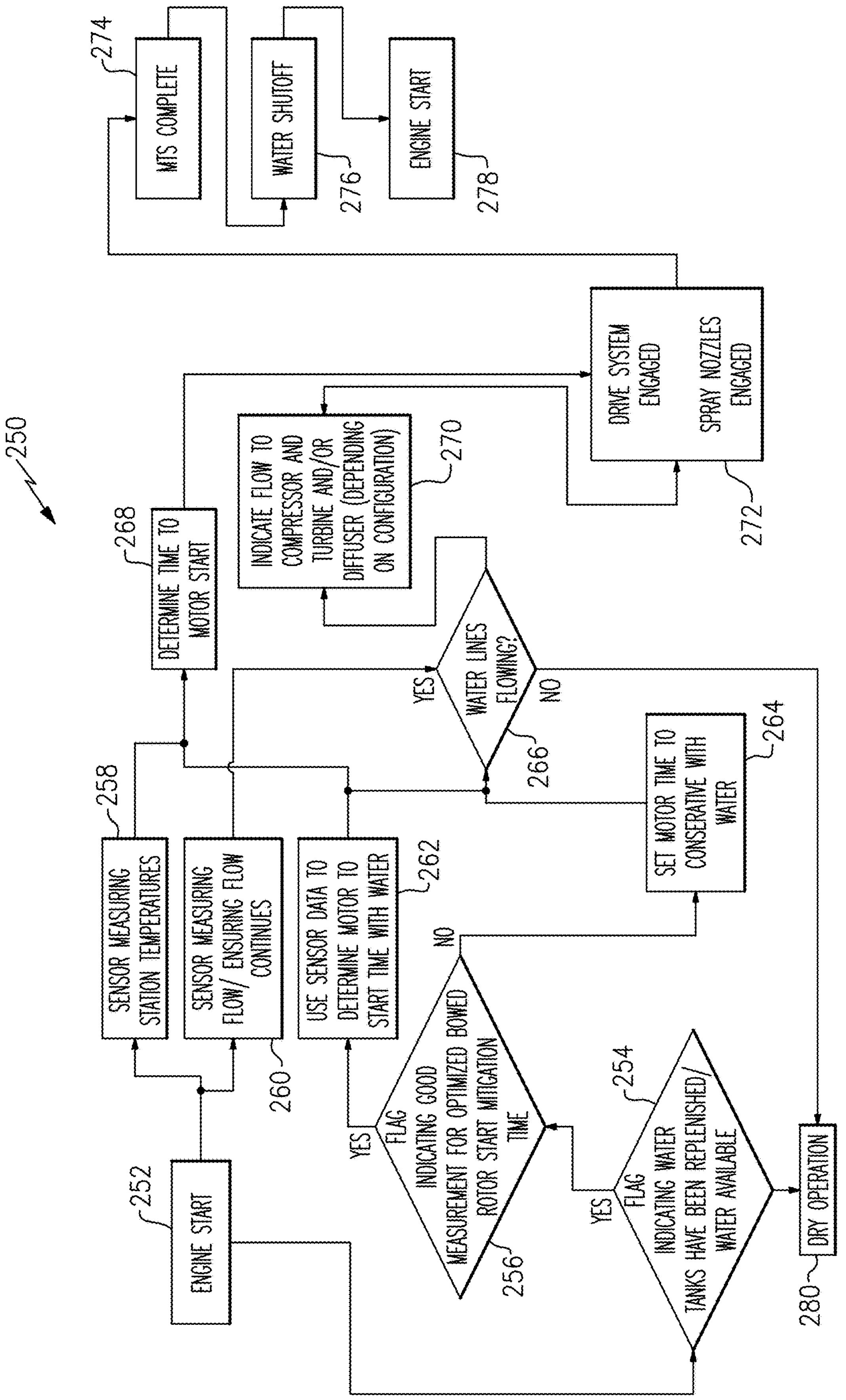
FIG. 7 is a flow diagram of process steps, for an example active mitigation start up process.

Referring to FIG. 7, with continued reference to FIG. 4, in one example operational embodiment, an example active mitigation start-up process is schematically shown and indicated at 250. The start up process 250 is performed after a brief period when the engine has not completely cooled. Initiation of engine start as indicated at 252 incorporates several checks to confirm that water is available for the mitigation process. In one example embodiment the quantity of water is checked and confirmed as indicated at 254. An estimated start mitigation time is determined and confirmed to fall within an acceptable range as indicated at 256. The checks indicated at 254 and 256 are concurrently performed with a check of temperatures at various locations throughout the engine as indicated at 258 and a flow measurement of water flow 260. The information regarding temperature 258, available water 254 and the estimated time 256 is used to determine the amount of time needed prior to starting the engine with the use of water as indicated at 262. The time of the mitigation process with water injection is determined and set as indicated at 264.

The initial information is utilized to determine a final confirmed time to motor start as indicated at 268 with the use of water injection. A confirmation of water flowing is made as indicated at 266 before water injection by the water injection system 72 is initiated as indicated at 270. With water flowing, the drive system 130 is engaged to being rotation of the high spool 32 and along with engagement of the water spray nozzles 102, 104 as indicated at 272. The process continues until completed as indicated at 274 based on the determinations regarding time at steps 268 and 264.

If water is not detected, the mitigation process will revert to a dry mitigation process as indicated at 280. Moreover, if the water runs out based information confirmed at step 266, the mitigation process would revert to the dry mitigation process 280.

Once the mitigation process 250 has operated for the determined time, an indication that the mitigation process is complete as indicated at 274 is obtained and triggers water shut off as indicated at 276. The engine start procedure may be initiated as indicated at 278.

Although the example operational embodiment has been described with regard to the high spool 32 including both the HPC 52 and the HPT 54, other or all the engine spools may benefit from example use of the example water injection system 72 in operation of active mitigation processes.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of mitigating rotor bow of a gas turbine engine comprising:

rotating a rotor within a fixed case structure at a first rotational speed with a drive system operable independent of power generation by the gas turbine engine;

injecting liquid water through a plurality of nozzles against at least one of the rotor and the fixed case structure;

monitoring water accumulation within the fixed case structure;

discontinuing the injection of water in response to at least one of an expiration of time, an indication that the at least one of the rotor and the fixed case structure are within a predefined temperature range, or that the monitored water accumulation within the fixed case structure exceeds a predefined amount of water; and continuing rotation of the rotor at the first rotational speed for a predefined time after discontinuing the injection of water.

2. The method as recited in claim 1, wherein the injection of water further comprises injecting water within a region of the rotor and the case structure above an engine longitudinal axis.

3. The method as recited in claim 1, further comprising recovering water from an exhaust gas flow during engine operation comprising combustion of a mixture of fuel and inlet air and storing the recovered water within a tank, wherein injecting water comprises drawing at least a portion of recovered water and injecting the water through at least one of the plurality of nozzles.

4. The method as recited in claim 1, wherein rotating the rotor further comprises coupling an electric motor to a shaft supporting the rotor and driving rotation of the rotor with the electric motor.

5. The method as recited in claim 1, further comprising discontinuing water injection prior to an engine start operation.

6. The method as recited in claim 1, further comprising initiating rotation of the rotor and injection of water after an engine shut down operation.

7. The method as recited in claim 1, further comprising measuring a parameter of at least one of the rotors and the case structure indicative of a bowed condition after engine shutdown and initiating the injection of water in response to the measured parameter indicating the presence of the bowed condition.

8. A method of mitigating rotor bow of a gas turbine engine comprising:

rotating a rotor within a fixed case structure at a first rotational speed with a drive system operable independent of power generation by the gas turbine engine;

injecting water against at least one of the rotor and the fixed case structure;

detecting a presence of water accumulation within the fixed case structure and discontinuing the injection of water in response to the detected water accumulation exceeding a predefined amount; and discontinuing the injection of water in response to at least one of an expiration of time and an indication that the at least one of the rotor and the fixed case structure are within a predefined temperature range.

9. The method as recited in claim 8, wherein the injection of water further comprises injecting water within a region of the rotor and the case structure above an engine longitudinal axis.

10. The method as recited in claim 8, further comprising recovering water from an exhaust gas flow during engine operation comprising combustion of a mixture of fuel and inlet air and storing the recovered water within a tank, wherein injecting water comprises drawing at least a portion of recovered water and injecting the water through at least one of a plurality of nozzles.

11. The method as recited in claim 8, wherein rotating the rotor further comprises coupling an electric motor to a shaft supporting the rotor and driving rotation of the rotor with the electric motor.

12. The method as recited in claim 8, further comprising discontinuing water injection prior to an engine start operation.

13. The method as recited in claim 8, further comprising initiating rotation of the rotor and injection of water after an engine shut down operation.

14. The method as recited in claim 8, further comprising monitoring water accumulation within the fixed case structure while injecting liquid water through a plurality of nozzles.

15. The method as recited in claim 8, further comprising measuring a parameter of at least one of the rotors and the case structure indicative of a bowed condition and initiating the injection of water in response to the measured parameter indicating the presence of the bowed condition.

* * * * *